United States Patent [19]

Gilbert

[11] Patent Number: 5,692,595
[45] Date of Patent: Dec. 2, 1997

[54] SCRAPER BLADE FOR BELT CONVEYORS

[75] Inventor: Robert Patrick Gilbert, Wetherill Park, Australia

[73] Assignee: Mato Australia Pty. Ltd., Wetherill Park, Australia

[21] Appl. No.: 541,710

[22] Filed: Oct. 10, 1995

[30] Foreign Application Priority Data

Oct. 11, 1994 [AU] Australia ............... PM 8726

[51] Int. Cl.$^6$ ............................................. B65G 45/16
[52] U.S. Cl. ........................................ 198/499; 198/497
[58] Field of Search ................................ 198/497, 499

[56] References Cited

U.S. PATENT DOCUMENTS

| | | |
|---|---|---|
| 4,598,823 | 7/1986 | Swinderman .............. 198/499 X |
| 4,838,409 | 6/1989 | Rappen ....................... 198/497 |
| 4,854,443 | 8/1989 | Gordon ....................... 198/499 X |
| 4,887,329 | 12/1989 | Perneczky ................... 198/499 X |
| 5,573,102 | 11/1996 | Puchalla ...................... 198/497 |

FOREIGN PATENT DOCUMENTS

| | | | |
|---|---|---|---|
| 0004809 | 10/1979 | European Pat. Off. ........ | 198/497 |
| 0486112 | 5/1992 | European Pat. Off. ........ | 198/499 |
| 3624754 | 1/1988 | Germany ....................... | 19/499 |

*Primary Examiner*—James R. Bidwell
*Attorney, Agent, or Firm*—Lahive & Cockfield, LLP

[57] ABSTRACT

A scraping apparatus 1 for use with a belt conveyor. The scraping apparatus 1 comprises a base portion 3 adapted for engagement with a holder 7 disposed to support the apparatus 1 adjacent a conveyor belt 2. A blade portion 10 is adapted to scrape the surface of the belt 2 and, thereby, remove residual material. An intermediate web portion 15 is resiliently deformable to permit a limited degree of relative displacement between the blade portion 10 and the base portion 3, to accommodate surface irregularities in the belt 2.

15 Claims, 1 Drawing Sheet

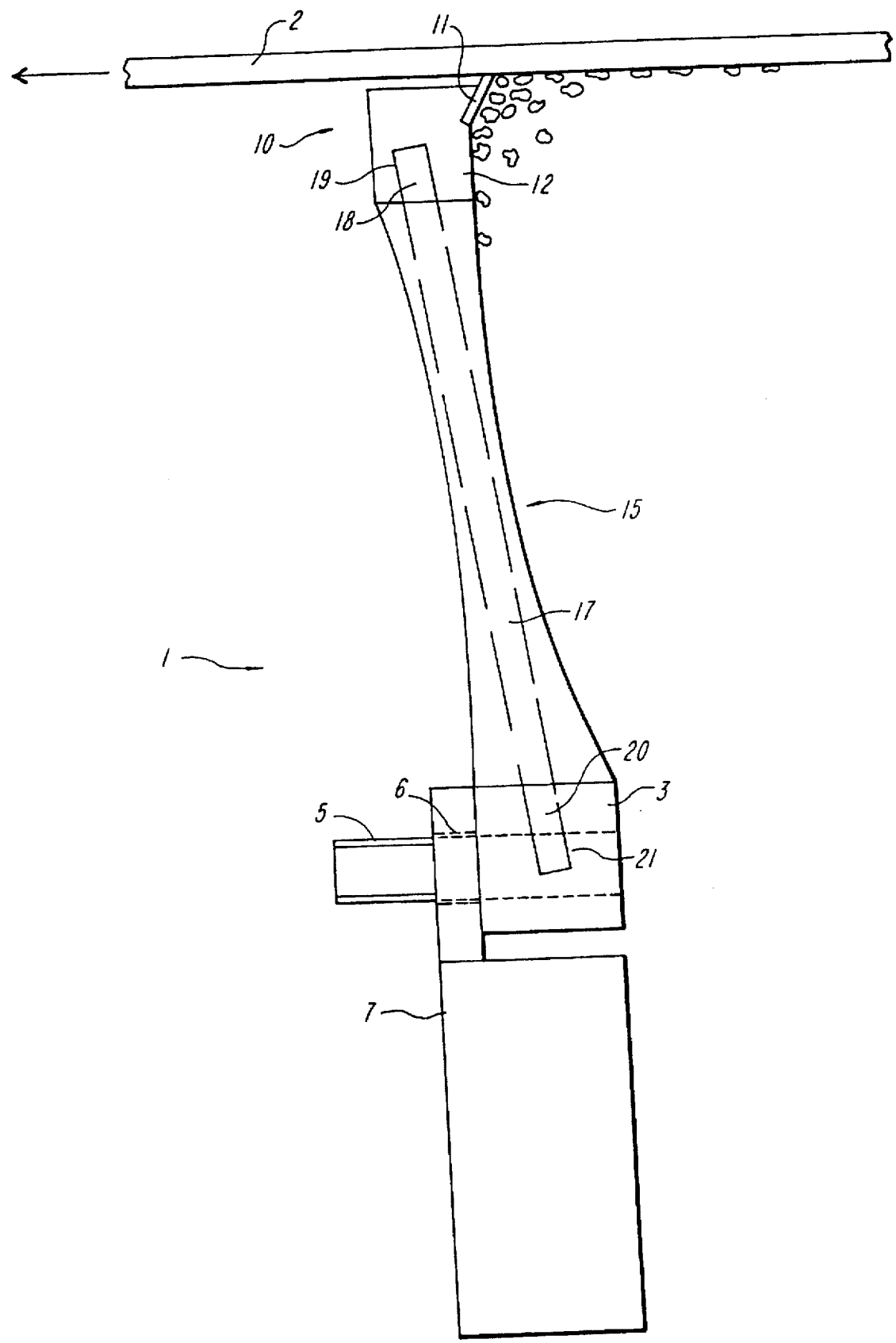

SCRAPER BLADE FOR BELT CONVEYORS

BACKGROUND OF THE INVENTION

The present invention relates generally to belt conveyors, and more particularly to a belt scraping apparatus for use with such conveyors.

Belt conveyors are used in a variety of applications for the transportation of particulate or granular material, such as coal, grain, ore, minerals, and the like.

One problem commonly encountered with belt conveyors is the tendency for particulate material to adhere to the surface of the belt. This problem is particularly significant in applications such as underground mining operations and coal transportation, where the material moving on the belt must continually be sprayed with water to suppress dust. The water mixes with the fine particulate component of the coal or other material, and forms a slurry which is particularly prone to sticking to the surface of the belt. This phenomenon reduces the transportation efficiency, and increases the running and maintenance costs of the conveyor.

In an attempt to ameliorate these problems, belt scraping devices have been developed to scrape residual debris from the surface of the belt. Such devices are normally positioned at or near the head pulley adjacent the intended discharge point, such that the lower run of the belt on its return loop is substantially clean.

However, known scraping devices have several inherent disadvantages. The most significant of these relates to the need for the scrapers to accommodate surface irregularities in the belt. Such irregularities most commonly take the form of belt fasteners, which are typically formed from steel and protrude beyond the surface of the belt. These fasteners can cause hardened scraping blades to break, chip or shatter, leading to reduced scraping efficiency and downtime whilst repair operations take place. This can also cause premature failure of the belt fasteners.

In an attempt to avoid these problems, some scraping blades have been formed from relatively soft materials such as polyurethane, polypropylene and other plastics. Whilst being better able to accommodate surface irregularities in the belt without breakage, such blades are prone to rapid abrasive wear and hence require frequent replacement. This is costly, and again often results in undesirable downtime. For this reason, belt scrapers of this type are not viable in many applications where highly abrasive materials are involved.

It is an object of the present invention to provide a belt scraping apparatus which overcomes or substantially ameliorates at least some of these disadvantages of the prior art.

SUMMARY OF THE INVENTION

Accordingly, the invention as presently contemplated provides a scraping apparatus for use with a belt conveyor, said scraping apparatus comprising a base portion adapted for engagement with a holder disposed to support the apparatus adjacent a conveyor belt, a blade portion adapted to scrape the surface of the belt and thereby remove residual material, and an intermediate web portion resiliently deformable to permit a limited degree of relative displacement between the blade portion and the base portion, to accommodate surface irregularities in the belt.

Preferably, the web portion is substantially flexible, relative to the base and blade portions of the apparatus.

In the preferred embodiment, the base is formed from solid steel bar having a generally square or rectangular cross-sectional profile. The base preferably incorporates a plurality of threaded studs disposed to extend through correspondingly spaced aperatures formed in a holding bracket, whereby threaded nuts engaging the studs releasably secure the scraping apparatus to the holder.

Preferably also, the blade incorporates a scraping edge or tip formed from a relatively hard material such as tungsten carbide, to minimize wear. The hardened tip is preferably tack welded or otherwise fastened to a relatively softer steel support bracket formed from a solid bar. The intermediate web portion is preferably formed from a relatively soft, flexible and resilient material such as polyurethane.

Preferably also, at least one reinforcing element in a form of a flexible resilient wire cable extends between the base and blade portions of the scraper, through the intermediate web, to accommodate the desired degree of resilient displacement whilst providing additional structural integrity for the composite assembly. Each end of the wire cable is preferably brazed or welded into a corresponding hole, bore or aperature, preformed respectively in the base or blade portions of the scraper. Preferably, each individual scraping apparatus incorporates at least three such reinforcing elements, and at least two mounting studs.

The scraping apparatus is preferably formed in a relatively short length, for example around 130 mm. With this arrangement, a number of such scrapers are preferably adapted for mounting on a common holding bracket in abutting side-by-side relationship to define an effectively continuous scaping blade assembly, the overall length of which is discrete multiple of the lengths of the individual scrapers.

BRIEF DESCRIPTION OF THE DRAWINGS

A preferred embodiment of the invention will now be described, by way of example only, with reference to the accompanying drawing, which is a cross-sectional side elevation showing a scraping assembly according to the invention, mounted to a holding bracket.

DESCRIPTION OF ILLUSTRATED EMBODIMENTS

Referring to the drawing, the invention provides a scraping apparatus 1 for use with a belt conveyor (not shown). Such conveyors typically comprise an endless flexible belt 2 extending between head pulleys and supported by intermediate guide rollers. The head pulleys, intermediate rollers, drive mechanisms and associated support structures of conventional belt conveyor assemblies are well known to those skilled in the art, and so will not be described in further detail.

The scraping apparatus 1 comprises a base portion 3 formed from a solid steel bar having a generally square or rectangular cross-sectional profile. The base 3 incorporates a plurality of threaded studs 5 disposed to extend through correspondingly spaced aperatures 6 formed in a holding bracket 7. Threaded nuts (not shown) engage the studs 5 to releasably secure the scraping apparatus to the holder 7, which forms part of a larger support structure of conventional type. In this way, the holder supports the scraper adjacent the conveyor belt 2.

The apparatus further includes a blade portion 10 comprising an elongate hardened tundsten carbide tip 11 mounted to a relatively softer steel support member 12, machined from solid steel bar. In this way, the elongate tip 11 defines a scraping edge in sliding contact with the belt.

The base portion 3 and blade portion 10 are joined by an intermediate web 15. This web is moulded from polyurethane or other suitable materials, to permit a limited degree of resilient displacement between the blade and the base of the scraper. The web section further includes a series of reinforcing elements in the form of flexible wire cables 17. The top end 18 of each cable is brazed or welded into a correspondence bore 19 formed in the lower surface of the blade tip support bar 12. Similarly, the lower end 20 of each reinforcing cable is brazed or welded into a corresponding bore 21 formed in the base bar 3 of the scraper. With the base bar 3, blade support bar 12, and intermediate reinforcing cables 17 thus welded or brazed together, the polyurethane web 15 is then moulded around this framework, such that the reinforcing cables are permanently embedded within the composite structure.

The steel reinforcing cables 17 are of sufficient flexibility and resiliency to accommodate the required degree of resilient deformation of the polyurethane web section, and yet provide the overall assembly with the necessary structural integrity.

The scraper is preferably formed in a relatively short length, for example around 130 mm. A scraper of this length ideally incorporates at least three reinforcing cables 17, and at least two spaced-apart mounting studs 5. With this arrangement, a number of such scrapers can be mounted on a common holding bracket in abutting side-by-side relationship, to define an effectively continuous scraping edge. The overall length of a composite blade of this nature corresponds to a discrete multiple of the length of each individual scraper, and as such can readily be varied to suit the width of the conveyor belt. Accordingly, if an individual scraper becomes damaged, it can be separately replaced. Otherwise, a substantially longer blade section may need to be replaced entirely, as a result of only localized damage. Because the flexible web portion accommodates a degree of resilient displacement between the base and blade portions of the scraper, this arrangement enables the scraping blade to traverse any surface irregularities in the belt. This, in turn, enables hardened scraping tips 11 to be used, which otherwise would be excessively brittle and prone to fracture. The use of hardened tips, in turn, reduces abrasive wear on the scraper, producing further benefits in terms of increased maintenance intervals and reduced downtime for replacement and repair. These advantages are particularly beneficial in enabling the scraping blade to ride over belt fasteners. Otherwise, these fasteners, protruding from the surface of the belt, can damage the scraping blades or can themselves be damaged by the blades, particularly if hardened tips are used, leading to premature failure of the belt. Also, the fact that the invention allows a relatively long scraping blade to be formed from discrete subunits increases the localized flexibility of the scraper in terms of its ability to traverse surface irregularities in the belt, and also facilitates repair of localized damage by replacement of individual scraping subunits. In all these respects, the invention represents a commercially-significant improvement over the prior art.

Although the invention has been described with reference to specific examples, it will be appreciated by those skilled in the art that the invention may be embodied in many other forms.

We claim:

1. A scraping apparatus for use with a belt conveyor, said scraping apparatus comprising a base portion adapted for engagement with a holder disposed to support the apparatus adjacent a conveyor belt, a blade portion adapted to scrape the surface of the belt and thereby remove residual material, an intermediate web portion resiliently deformable to permit a limited degree of relative displacement between the blade portion and the base portion to accommodate surface irregularities in the belt, and at least one reinforcing element extending between the base and the blade portions, through the intermediate web, to accommodate the desired degree of resilient displacement whilst providing additional structural integrity.

2. A scraping apparatus according to claim 1, wherein said web portion is substantially flexible, relative to the base and blade portions.

3. A scraping apparatus according to claim 1, wherein said base is formed from a solid rigid bar having a generally square or rectangular cross-sectional profile, and incorporates a plurality of threaded members disposed to extend through correspondingly spaced apparatus apertures formed in the holder, whereby threaded nuts engaging the threaded members releasably secure the scraping apparatus to the holder.

4. A scraping apparatus according to claim 3, wherein said solid bar is formed from steel.

5. A scraping apparatus according to claim 1, wherein said blade incorporates a scraping tip formed from a hardened material, to minimize wear.

6. A scraping apparatus according to claim 5, wherein said hardened material is tungsten carbide.

7. A scraping apparatus according to claim 6, wherein said scraping tip is releasably fastened to a relatively softer steel support bracket to enable replacement of worn tips.

8. A scraping apparatus according to claim 1, wherein said web portion is formed from a relatively soft, flexible and resilient material.

9. A scraping apparatus according to claim 8, wherein said web portion is formed from polyurethane.

10. A scraping apparatus according to claim 1, wherein said reinforcing element comprise lengths of wire cable, each extending between the base and the blade portions.

11. A scraping apparatus according to claim 10, wherein each end of each wire cable reinforcing element is brazed or welded into a corresponding hole, bore or aperture preformed respectively in the base or blade portion of the scraper.

12. A scraping apparatus according to claim 1, further including at least three of said reinforcing elements.

13. A scraping apparatus according to claim 1, having a blade length of approximately 100 mm. to 200 mm.

14. A scraping apparatus according to claim 13, having a blade length of approximately 130 mm.

15. A scraping assembly for use with belt conveyors, said assembly comprising a plurality of scraping apparatus, each according to claim 1, and adapted for mounting on a common holding bracket in abutting side-by-side relationship to define an effectively continuous blade, the overall length of which corresponds to a discrete multiple of the length of each individual scraping apparatus.

* * * * *